United States Patent
Ishigaki et al.

(10) Patent No.: US 7,692,744 B2
(45) Date of Patent: Apr. 6, 2010

(54) LIQUID CRYSTAL DISPLAY DEVICE HAVING DIFFUSION REFLECTIVE ELECTRODES AND A MANUFACTURING METHOD THEREOF

(75) Inventors: Toshimasa Ishigaki, Chiba (JP); Masahiro Nishizawa, Mobara (JP); Fumio Takahashi, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 214 days.

(21) Appl. No.: 11/907,369

(22) Filed: Oct. 11, 2007

(65) Prior Publication Data
US 2008/0088776 A1   Apr. 17, 2008

(30) Foreign Application Priority Data
Oct. 13, 2006   (JP) .............................. 2006-279708

(51) Int. Cl.
G02F 1/1335   (2006.01)
H01L 21/00   (2006.01)

(52) U.S. Cl. .......................... 349/114; 349/113; 438/30
(58) Field of Classification Search ................. 349/114, 349/113; 438/30
See application file for complete search history.

(56) References Cited

U.S. PATENT DOCUMENTS 5,714,247 A * 2/1998 Kuo et al. .................... 428/323
6,897,923 B2 * 5/2005 Kanesaka et al. ........... 349/113

FOREIGN PATENT DOCUMENTS

JP   2002-350840   5/2001
JP   2003-322849   4/2002

* cited by examiner

*Primary Examiner*—Mike Qi
(74) *Attorney, Agent, or Firm*—Stites & Harbison PLLC; Juan Carlos A. Marquez, Esq.

(57) ABSTRACT

The present invention provides a transflective liquid crystal display device which includes diffusion reflective electrodes suitable for a display of high definition. Into an organic resin film material PET which is formed by mixing NQD as a photosensitive agent in an acrylic resin having a specific gravity of 1.05 and a refractive index of 1.50, spherical particles PTC made of acrylic modified polystyrene which has a specific gravity of 1.00, a refractive index of 1.50 and a particle size of 1.6 μm are mixed at a rate of 3:1 so as to form an organic insulation film material in which a total solid content is adjusted to 30% and viscosity is adjusted 20 mPa·s. The organic insulation film material is applied and is dried to form an organic insulation film. A portion of the organic insulation film which is to be arranged below a diffusion reflective electrode is exposed using an exposure mask having half exposure apertures which are formed of a large number of slits and the organic insulation film is hardened. Aluminum is sputtered to the organic insulation film and is subject to photolithography etching treatment thus forming the diffusion reflective electrodes MT in a reflective region. A reflective region of the diffusion reflective electrode MT has an uneven surface shape which traces uneven surface shapes of the spherical particles PTC mixed into the organic insulation film PF arranged below the diffusion reflective electrodes MT.

10 Claims, 5 Drawing Sheets

LIQUID CRYSTAL DISPLAY DEVICE HAVING DIFFUSION REFLECTIVE ELECTRODES AND A MANUFACTURING METHOD THEREOF

The present application claims priority from Japanese applications JP2006-279708 filed on Oct. 13, 2006, the content of which is hereby incorporated by reference into this application.

BACKGROUND OF THE INVENTION

1. Field of the Invention

The present invention relates to a liquid crystal display device, and more particularly to a transflective liquid crystal display device which includes both of a transmissive region and a reflective region in each pixel region, and a manufacturing method thereof.

2. Description of Related Art

As a liquid crystal display device, there have been known a reflective liquid crystal display device, a transmissive liquid crystal display device, and a transflective liquid crystal display device which is the combination of the reflective liquid crystal display device and the transmissive liquid crystal display device. The transflective liquid crystal display device forms both of a transmissive region which allows light from a backlight to pass therethrough and a reflective region which reflects an external light in each pixel region thus realizing advantages of the transmissive liquid crystal display device and the reflective liquid crystal display device by one liquid crystal display device.

As a type of transflective liquid crystal display device, there has been known a transflective liquid crystal display device which includes incorporated diffusion plates (inner-surface diffusion reflection plates). The incorporated diffusion plate includes a metal film which diffuses and reflects an external light incident from a display screen side in the direction toward the display screen in a reflective region of each one pixel on an inner surface of the substrate. FIG. 11 is a schematic plan view for explaining a constitutional example of one color pixel of the transflective liquid crystal display device. A color pixel CP is constituted of three pixels (also referred to as sub pixels) R, G, B forming a trio. The respective pixels R, G, B are defined by a black matrix BM, wherein the pixel R includes a reflective portion RR and a transmissive portion TR, the pixel G includes a reflective portion RG and a transmissive portion TG, and the pixel B includes a reflective portion RB and a transmissive portion TB.

A size in the lateral direction (a size in the gate-line direction) of the reflective portions RR, RG, RB is indicated by PH and a size in the longitudinal direction (a size in the data-line direction) of the reflective portions RR, RG, RB is indicated by PV. A size in the lateral direction of the transmissive portions TR, TG, TB is indicated by PH and a size in the longitudinal direction of the transmissive portions TR, TG, TB is indicated by TV. A size in the lateral direction of the color pixel CP is indicated by PH and a size in the longitudinal direction of the color pixel CP is indicated by PV.

FIG. 12 is a cross-sectional view taken along a line A-A' in FIG. 11 for explaining a constitutional example of a transflective liquid crystal display device. In FIG. 12, the transmissive portions TR, TG, TB shown in FIG. 11 are collectively indicated as a transmissive region TA, and the reflective portions RR, RG, RB shown in FIG. 11 are collectively indicated as a reflective region RA. In FIG. 12, a thin film transistor TFT is formed on an inner surface of a TFT substrate SUB1 which constitutes a first substrate. The thin film transistor TFT is formed of a gate electrode GT, a gate insulation film GI, a silicon semiconductor layer (not shown in the drawing), a source electrode (drain electrode) SD1, and a drain electrode (source electrode) SD2.

A protective film PAS which is preferably made of a transparent insulating material is formed in a state that the protective film PAS covers thin film transistors TFT, and pixel electrodes PX formed of a transparent conductive film which is preferably made of ITO are formed on the protective film PAS. The pixel electrode PX is connected to the source electrode (drain electrode) SD1 via a contact hole CH formed in the protective film PAS, and is driven by the thin film transistor TFT. In such a constitution, a film thickness of the protective film PAS is small in the transmissive region TA and is large in the reflective region RA. On a surface of the protective film PAS in the reflective region RA, a diffusion reflective electrode MT having an uneven surface which is formed of a sputtered metal film is formed. A cell gap g1 in the transmissive region TA is set to a value twice as large as a cell gap g2 in the reflective region RA so as to make optical phases of transmissive light and reflection light agree with each other. As a constitutional example in which a resin-made coating film containing particles therein is used and a diameter of the particles is set larger than a film thickness of a coated film thus allowing the particles to project from the coating film to form an unevenness of a background layer of a diffusion reflective electrode on a surface thereof, a technique disclosed in patent document 1 can be named.

On the other hand, on an inner surface of a color filter substrate (CF substrate) SUB2 which constitutes a second substrate, color filters CF which are defined by a black matrix BM, an overcoat layer OC and counter electrode (common electrodes) AT are formed. Here, although an orientation film is formed on an interface between the TFT substrate and a liquid crystal layer, such orientation layers are omitted from the drawings.

Further, the orientation of liquid crystal is disturbed by a stepped portion between the transmissive portion TA and the reflective portion RA and leaking of light occurs in performing a black display. Here, the black matrix BM is provided between the neighboring pixels and hence, the black matrix BM constitutes a non-transmissive portion NT whereby the leaking of light does not occur. However, the disturbance of orientation at the stepped portion in the inside of the pixel causes leaking of light LK thus lowering the display quality. FIG. 13 shows a method which can cope with this lowering of quality. FIG. 13 is a cross-sectional view similar to FIG. 12 and explains a structural example of a transflective liquid crystal display device which possesses the light leaking prevention structure. The structure shown in FIG. 13 prevents the leaking of light by forming such a portion into a non-transmissive portion NT by covering a side surface of the stepped portion with a metal film MT (see JP-A-2002-350840).

SUMMARY OF THE INVENTION

Along with a demand for high definition of a liquid crystal display, it is also necessary to form a diffusion reflective electrode with high accuracy. The demand for high accuracy of the diffusion reflective electrode requires the higher accuracy of unevenness formed on a surface of an insulation layer which constitutes a background. In a conventional technique, unevenness is formed on the surface of the insulation layer by applying a solution which is produced by mixing fine particles into a resin binder to the surface of the insulation layer in a state that a film thickness of the resin binder is set smaller than a diameter of the fine particles. However, such a technique suffers from a large surface irregularities and hence, it is difficult for the conventional technique to ensure the uniformity of the unevenness size, the unevenness distribution and the uniformity of mass production. Further, it is difficult for the conventional technique to manufacture diffusion reflective electrodes with high accuracy at a low cost.

It is an object of the present invention to provide a transflective liquid crystal display device which includes diffusion reflective electrodes suitable for high-definition display and a manufacturing method thereof.

To achieve the above-mentioned objects, according to a transflective liquid crystal display device of the present invention, the reflective region to which a diffusion reflective function is imparted is formed of an insulation layer having a low dielectric constant which includes an organic insulation layer and spherical particles having a refractive index substantially equal or similar to a refractive index of the organic insulation layer, a diameter of the spherical particles is set larger than a film thickness of the organic insulation layer thus forming an uneven surface, and a diffusion reflective electrode is formed of a metal film which is formed on the uneven surface in a state that the metal film traces a surface shape of the uneven surface.

Further, according to the present invention, the insulation layer having a low dielectric constant in which a film thickness of the organic insulation layer is set larger than a diameter of the spherical particles may be provided between a transmissive region and the reflective region. Further, according to the present invention, by setting a ratio between a cell gap in the reflective region and a cell gap in the transmissive region to 1:2, it is possible to make a phase of a transmissive light and a phase of a reflection light agree with each other.

Further, in a manufacturing method of a transflective liquid crystal display device according to the present invention, an organic insulation film material which is formed by mixing spherical particles in an organic insulation resin material is applied to an inner surface of a first substrate (usually, a thin film transistor substrate) and, thereafter, the organic insulation film material is dried to form an organic insulation film.

The organic insulation film is exposed through an exposure mask having apertures in transmissive regions and half tone exposure slits in the reflective regions, and the exposed portions by the apertures are removed and a film thickness of the organic insulation film in half-tone exposed portions by the half tone exposure slits is reduced thus exposing portions of the spherical particles, the organic insulation film after exposure is hardened by baking, and a metal thin film is formed on the hardened organic insulation film thus forming a diffusion reflection layer having an uneven surface which traces an uneven surface formed by the exposure of the spherical particles.

Further, according to the present invention, in the half tone exposure in the exposure and developing steps, a film thickness of the organic insulation film may be decreased by developing by an amount corresponding to 50% of a diameter of the spherical particles thus exposing halves of the spherical particles.

Further, according to the present invention, an arrangement pitch of unevenness of the diffusion reflection layer may be adjusted at a mixing ratio of the spherical particles in the organic insulation resin material of the organic insulation film material.

Further, according to the present invention, the organic insulation resin material maybe formed by mixing naphthoquinone diazido (NQD) which constitutes a photosensitive agent into one selected from a group consisting of an acrylic resin, an epoxy resin, an olefin resin and a phenol resin having a low dielectric constant and high transparency or may be formed by mixing a photoacid generator into the organic insulation resin material.

Since the roughness and the pitch of the surface unevenness can be controlled based on the particle size of the spherical fine particles and the mixing ratio of the spherical fine particles with the organic insulation resin material, it is possible to acquire a diffusion plate background with high accuracy having the highly-define unevenness without irregularities in a surface shape. Accordingly, by forming the metal film on the diffusion plate background, it is possible to acquire the transflective liquid crystal display device which includes the diffusion reflective electrodes with high accuracy which trace the surface shape of the diffusion plate background.

By setting the refractive index of the organic insulation resin material and the refractive index of the spherical fine particles substantially equal to each other, it is possible to ensure the transparency even when the film formed of the organic insulation resin material containing the spherical fine particles remains in the transmissive region. Further, by setting the film thickness of the organic insulation resin material larger than the diameter of the spherical fine particles contained in the organic insulation resin material in other portions where such organic insulation resin material remains in structure, it is possible to flatten the surface of the film formed of the organic insulation resin material.

According to the present invention, even when some irregularities exist with respect to exposure, developing, baking or the like during a manufacturing process, it is possible to acquire the shape of surface unevenness with high reproducibility and hence, the mass productivity can be enhanced. Further, the reflective regions having surface unevenness and the transmissive regions having no surface unevenness can be simultaneously formed by the halftone exposure, that is, can be formed by performing a photolithography step one time and hence, the mass productivity can be enhanced.

DESCRIPTION OF THE PREFERRED EMBODIMENTS

Hereinafter, preferred embodiments of the present invention are explained in detail in conjunction with drawings which show the embodiments.

Embodiment 1

Figure 11:
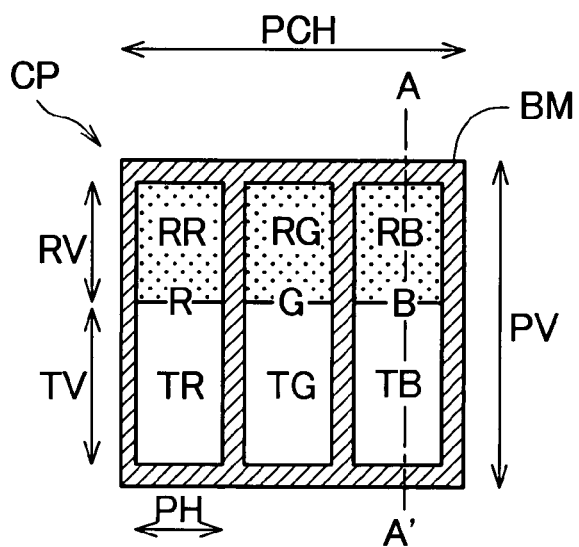
FIG. 11 is a schematic plan view for explaining one constitutional example of one color pixel of the transflective liquid crystal display device.
Figure 12:
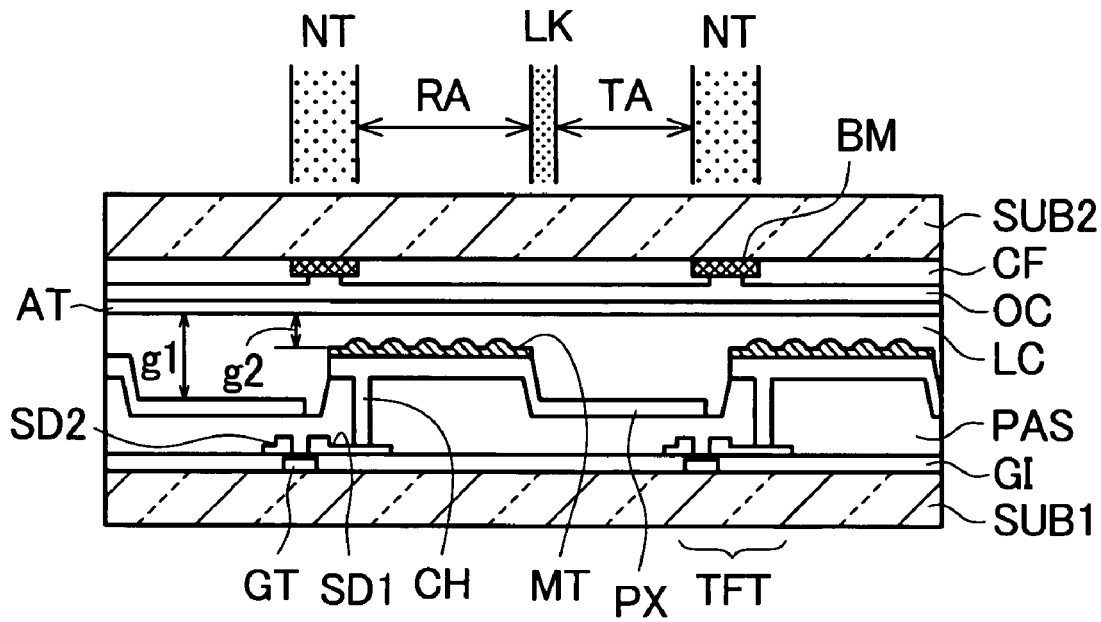
FIG. 12 is a cross-sectional view taken along a line A-A' in FIG. 11 for explaining a structural example of the transflective liquid crystal display device.
Figure 13:
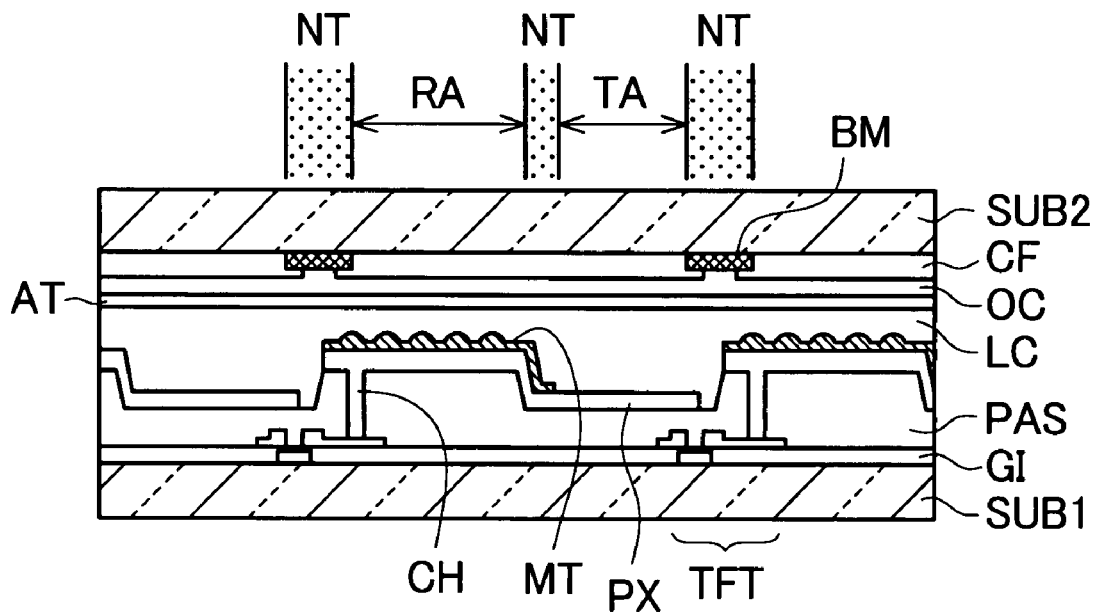
FIG. 13 is a cross-sectional view similar to FIG. 12 for explaining a structural example of the transflective liquid crystal display device which includes the light leaking prevention structure.

A liquid crystal display device of an embodiment 1 according to the present invention is explained in conjunction with a manufacturing process. The entire structure of the liquid crystal display device is substantially equal to the structure of the liquid crystal display device explained in conjunction with FIG. 11 and FIG. 12. However, while a film made of an organic insulation resin material remains also below a pixel electrode PX in a transmissive region in the structure shown in FIG. 11 and FIG. 12, in the embodiment 1, the explanation is made with respect to a case in which the pixel electrode PX in the transmissive region is directly formed on an inner surface of a first substrate (TFT substrate) SUB1. It is needless to say that the present invention is also applicable to a transflective liquid crystal display device shown in FIG. 11 and FIG. 12 in the same manner.

Figure 1:
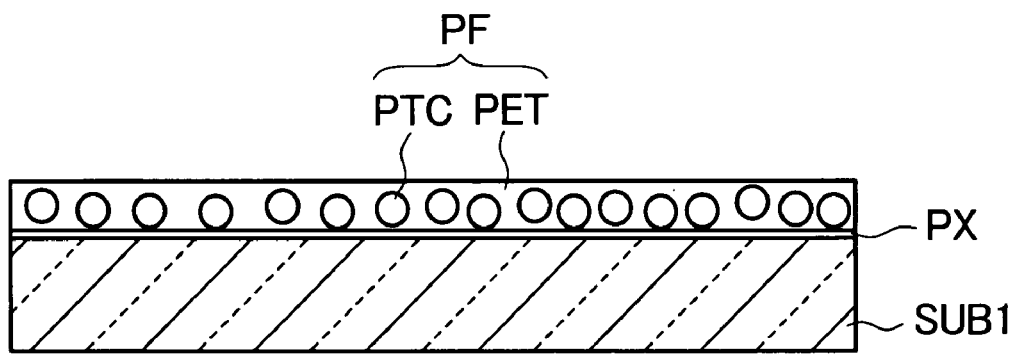
FIG. 1 is a cross-sectional view of an essential part for schematically explaining a manufacturing process of an embodiment 1 of a transflective liquid crystal display device according to the present invention.

FIG. 1 to FIG. 5 are cross-sectional views of an essential part for schematically explaining a manufacturing process of the embodiment 1 of a transflective liquid crystal display device according to the present invention. Hereinafter, the embodiment 1 is explained in conjunction with FIG. 1 to FIG. 5 in order. First of all, an organic insulation film material solution having the following composition and properties is applied by spin coating to an inner surface of the TFT substrate SUB1 on which pixel electrodes PX preferably made of ITO are formed, and is dried by a hot plate (FIG. 1). A film thickness of an organic insulation film PF obtained after drying is set to 2.5 μm.

Composition of Organic Insulation Film Material Solution

Organic resin film material PET formed by mixing NQD as a photosensitive agent into an acrylic resin having a specific gravity of 1.05 and a refractive index of 1.50.

Spherical particles PTC made of acrylic modified polystyrene having a specific gravity of 1.00, a refractive index of 1.50, and a particle size of 1.6 μm.

The organic resin film material PET and the spherical particles PTC are blended at a weight ratio of 3:1 thus producing an organic insulation film material solution in which a total solid content is adjusted to 30% and viscosity is adjusted to 20 mPa·s.

Figure 2:
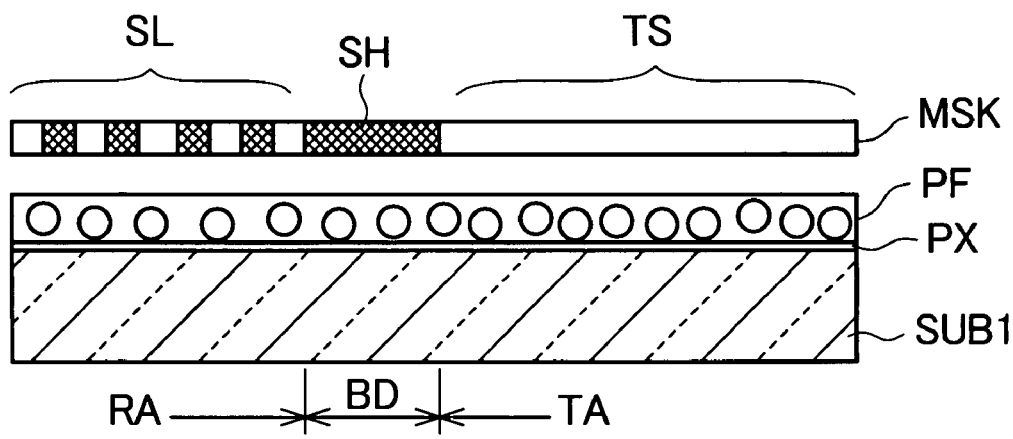
FIG. 2 is a view which follows FIG. 1 and is a cross-sectional view of an essential part for schematically explaining a manufacturing process of the embodiment 1 of the transflective liquid crystal display device according to the present invention.

Next, the organic insulation film PF is exposed using an exposure mask MSK (FIG. 2). The exposure mask MSK is a so-called half tone exposure mask. The exposure mask MSK is constituted of a light blocking portion SH formed in a portion thereof where the organic insulation film remains after exposure, an exposed portion in a reflective region RA formed in a portion thereof which constitutes a layer (background) below a diffusion reflection electrode MT and having a half tone exposure opening portion formed of a large number of slits SL having a width of 1.5 μm, and an exposed portion in a transmissive region TA formed of a large opening. In an exposure machine, a numerical aperture (NA) is set to 0.08 and an exposure quantity is set to 150 mJ/cm$^2$. Here, gate lines or drain lines may be mounted on a lower side of the light blocking portion SH.

The half tone exposure (hereinafter, simply referred to as half exposure) according to the present invention is an exposure method which allows the exposed portion of the organic insulation film to have a film thickness approximately half a thickness of a non-exposed portion of the organic insulation film using the exposure mask which forms slits having resolution equal to or less than a limit resolution of the exposure machine (the above-mentioned slits SL). By performing the exposure using the mask in which the slits having the resolution equal to or less than the limit resolution of the exposure machine (the above-mentioned slits SL), a mask pattern cannot be reproduced at a slit SL portion having the resolution equal to or less than the limit resolution and hence, an exposure pattern which is substantially equal to an exposure pattern which is acquired by exposing a whole region of the slit portion can be acquired with a light reduction quantity corresponding to a light blocking area portion of the slits. As a result, the mask transmissive portion with 0% of the remaining film, the mask light blocking portion with 100% of the remaining film, and the slit SL portion having the resolution equal to or less than the limit resolution with 50% of the remaining film can be obtained by performing the exposure one time.

For example, when the exposure machine having the numerical aperture (NA) of 0.08 is used, the limit resolution becomes about 2 μm and hence, the half exposure can be realized by forming slits having a width of 1.5 μm or less. When the exposure machine having the numerical aperture (NA) of 0.14 is used, the half exposure can be realized by forming slits having a width of 0.8 μm or less.

Further, to obtain the half film thickness, it is necessary to use naphthoquinone diazido (NQD) or an organic insulation film material having a positive photo function using a photoacid generator as a photosensitive agent. A positive photoresist which uses the above-mentioned photo sensitive agent exhibits the development solubility corresponding to a radiated light quantity and hence, an arbitrary film thickness can be obtained by controlling an exposure quantity.

Figure 3:
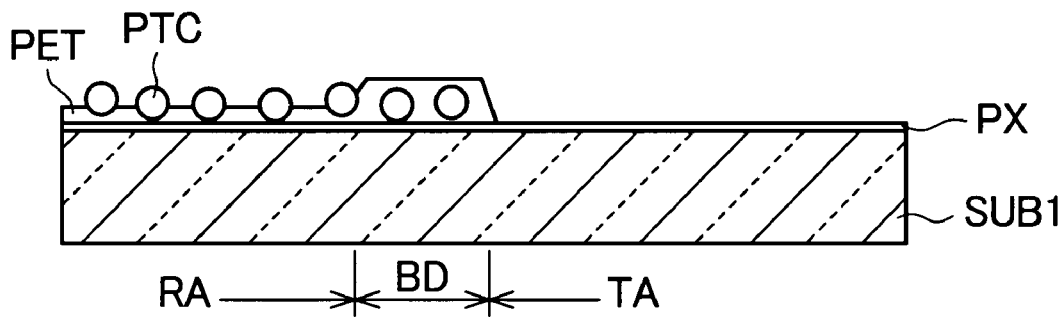
FIG. 3 is a view which follows FIG. 2 and is a cross-sectional view of an essential part for schematically explaining a manufacturing process of the embodiment 1 of the transflective liquid crystal display device according to the present invention.

The organic insulation film PF exposed in this manner is developed for 80 seconds using 0.4% of tetramethyl ammonium hydrooxide (TMAH) at a liquid temperature of 25° C. and, thereafter, the organic insulation film PF is cleaned with water. Here, a film thickness of the organic insulation film PF at the non-exposed portion is 2.3 μm. Then, the whole area of an inner surface of the substrate is exposed with an exposure quantity of 300 mJ/cm² so as to make the photosensitive agent transparent and, thereafter, the organic insulation film PF is heated for 30 minutes by an oven set at a temperature of 230° C. thus hardening the organic insulation film PF (FIG. 3).

Figure 4:
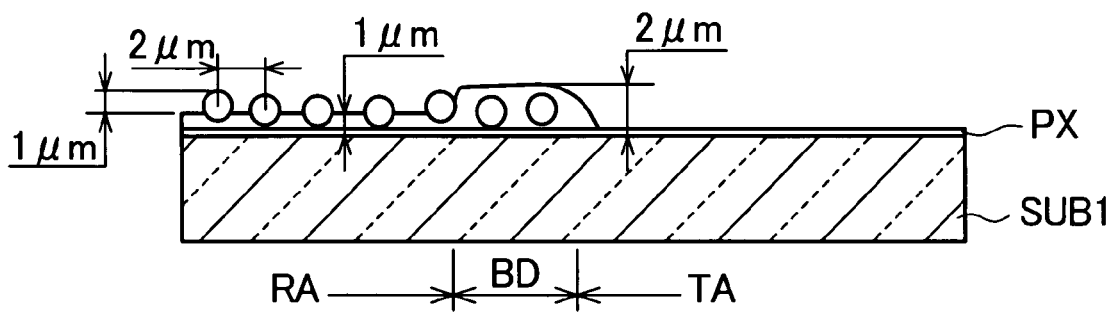
FIG. 4 is a view which follows FIG. 3 and is a cross-sectional view of an essential part for schematically explaining a manufacturing process of the embodiment 1 of the transflective liquid crystal display device according to the present invention.

A thickness of recessed portions of an uneven surface of the hardened region of the organic insulation film PF corresponding to the reflective region, that is, a film thickness of the organic insulation film PF at the recessed portions is 1 μm, a radius of projecting portions, that is, a radius of spherical particles is 1 μm, a height of the organic insulation film PF at the projecting portions is 1 μm, and a pitch between peaks of the projecting portions is 2 μm. Further, a film thickness of the organic insulation film PF in a region BD corresponding to the non-exposed portion covered with the light blocking portion SH is 2 μm and exhibits a flat surface state. That is, there is no projection of the spherical particles from the surface of the organic insulation film PF in the region BD (FIG. 4).

Figure 5:
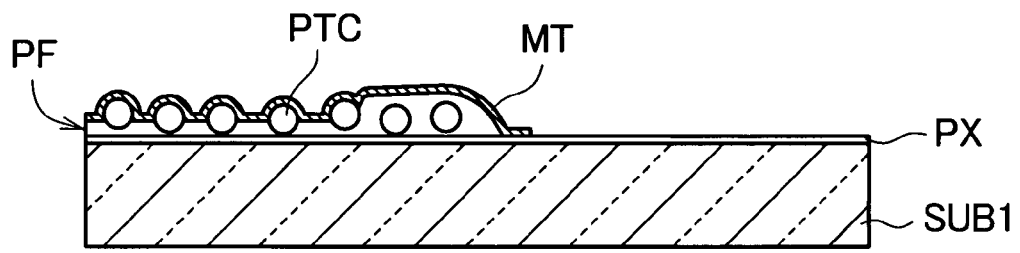
FIG. 5 is a view which follows FIG. 4 and is a cross-sectional view of an essential part for schematically explaining a manufacturing process of the embodiment 1 of the transflective liquid crystal display device according to the present invention.

Aluminum is applied to the organic insulation film PF by sputtering thus forming a diffusion reflective electrode MT in the reflective region RA by photolithography-etching treatment (FIG. 5). A reflective region of the diffusion reflective electrode MT has an uneven surface shape which traces an uneven surface shape formed by the spherical particles PTC mixed in the organic insulation film PF arranged below the diffusion reflective electrode MT. The diffusion reflective electrode MT is electrically connected with the pixel electrode PX at a portion thereof arranged close to the transmissive region. Here, including an embodiment 2 described later, a metal film may be formed in a multiple layer by sputtering high reflective metal such as molybdenum before sputtering aluminum.

According to this embodiment 1, it is possible to acquire the diffusion plate background with high accuracy which possesses the highly-define unevenness without irregularities in a surface shape. Accordingly, by forming the thin metal film using a method which preferably uses sputtering on the diffusion plate background, it is possible to obtain a transflective liquid crystal display device which includes the highly accurate diffusion reflective electrode which traces the surface shape of the diffusion plate background.

Embodiment 2

Figure 6:
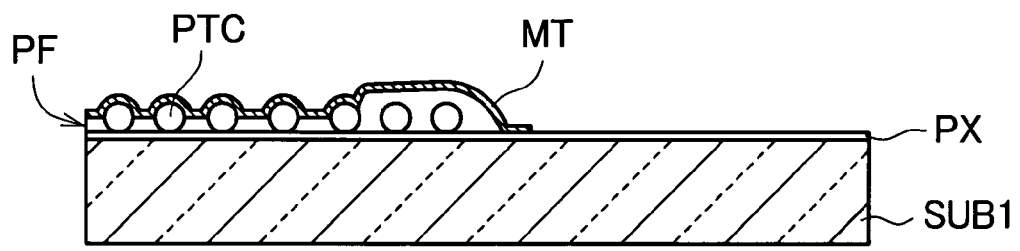
FIG. 6 is a cross-sectional view of an essential part for schematically explaining an embodiment 2 of a transflective liquid crystal display device according to the present invention.

FIG. 6 is a cross-sectional view of an essential part for schematically explaining an embodiment 2 of the transflective liquid crystal display device according to the present invention. Composition of an organic insulation film material solution of the embodiment 2 is as follows.

Organic resin film material PET formed by mixing NQD as a photosensitive agent into an acrylic resin having a specific gravity of 1.05 and a refractive index of 1.50.

Spherical particles PTC made of quartz beads having a specific gravity of 2.65, a refractive index of 1.45, and a particle size of 1.8 μm.

The organic resin film material PET and the spherical particles PTC are blended at a weight ratio of 1:1 thus producing the organic insulation film material solution in which a total solid content is adjusted to 40% and viscosity is adjusted to 20 mPa·s.

The organic insulation film material solution having the above-mentioned composition and properties is applied by spin coating to an inner surface of the TFT substrate SUB1 on which pixel electrodes PX preferably made of ITO are formed, and is dried by a hot plate. A film thickness of an organic insulation film PF obtained after drying is set to 2.5 μm.

The organic insulation film PF is exposed using a half exposure mask substantially equal to the half exposure mask of the embodiment 1, and is developed for 80 seconds using 0.4% of TMAH at a liquid temperature of 25° C. and, thereafter, the organic insulation film PF is cleaned with water. Here, a film thickness of the organic insulation film PF at a non-exposed portion is 2.3 μm. Then, the whole area of an inner surface of the substrate is radiated with light with an exposure quantity of 300 mJ/cm² so as to make a photosensitive agent transparent and, thereafter, the organic insulation film PF is heated for 30 minutes by an oven which is set at a temperature of 230° C. thus hardening the organic insulation film PF. In a completed uneven portion, a film thickness of recessed portions is 1 μm, a height of projecting portions is 1 μm, a radius of the spherical fine particles is 1 μm, and a pitch between peaks of projecting portions is 2 μm. Further, a film thickness of a non-exposed portion of the organic insulation film PF is 2 μm and no projection of the particles is found on a surface of the non-exposed portion of the organic insulation film PF thus exhibiting a flat surface.

Thereafter, in the same manner as the embodiment 1, aluminum is applied to the organic insulation film PF by sputtering thus forming a diffusion reflective electrode MT in the reflective region RA by photolithography-etching treatment. A reflective region of the diffusion reflective electrode MT has an uneven surface shape which traces an uneven surface shape formed by the spherical particles PTC mixed in the organic insulation film PF arranged below the diffusion reflective electrode MT. The diffusion reflective electrode MT is electrically connected with the pixel electrode PX at a portion thereof arranged close to the transmissive region.

Also according to this embodiment 2, it is possible to acquire the diffusion plate background with high accuracy which possesses the highly-define unevenness without irregularities in a surface shape. Accordingly, by forming the thin metal film on the diffusion plate background, it is possible to obtain a transflective liquid crystal display device which includes the highly accurate diffusion reflective electrode which traces the surface shape of the diffusion plate background.

Next, comparison examples 1, 2, 3 which are prepared for evaluating the above-mentioned respective embodiments of the present invention are explained and, thereafter, the respective embodiments of the present invention are evaluated in comparison with the comparison examples.

COMPARISON EXAMPLE 1

Figure 7:
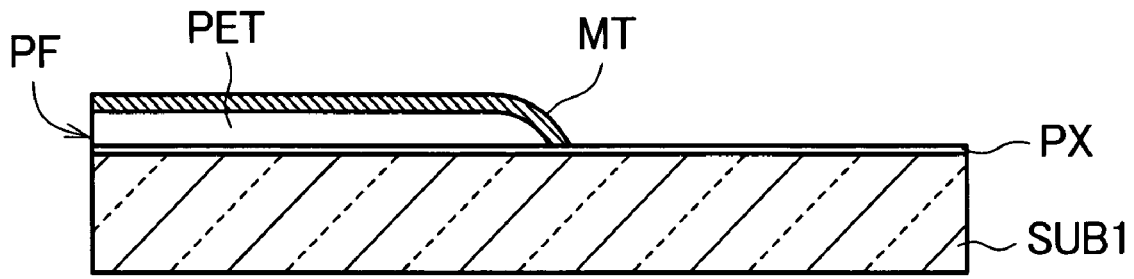
FIG. 7 is a cross-sectional view of an essential part for schematically explaining a transflective liquid crystal display device of a comparison example 1 to be compared with the present invention.

FIG. 7 is a cross-sectional view of an essential part for schematically explaining a transflective liquid crystal display device of a comparison example 1 to be compared with the present invention. In the comparison example 1, as an organic resin film material PET, an organic insulation film material solution which is formed by mixing NQD as a photosensitive agent into an acrylic resin having specific gravity of 1.05 and refractive index of 1.50 is used, and spherical particles are not mixed into the organic insulation film material solution. The organic insulation film material solution is applied to an inner surface of the TFT substrate SUB1 by spin coating, and is dried by a hot plate thus forming an organic insulation film PF having a film thickness of 2.5 μm.

The organic insulation film PF is exposed using an exposure mask in which an opening is formed in a transmissive region, and light is blocked at a portion where the organic insulation film PF remains in the same manner as the embodiment 1 and, at the same time, light is blocked also in a whole reflective region. Then, the organic insulation film PF is developed for 80 seconds using 0.4% of TMAH at a liquid temperature of 25° C. and, thereafter, the organic insulation film PF is cleaned with water. Here, a film thickness of the organic insulation film PF at a non-exposed portion is 2.3 μm. Then, the whole area of an inner surface of the substrate is radiated with light with an exposure quantity of 300 mJ/cm$^2$ so as to make a photosensitive agent transparent and, thereafter, the organic insulation film PF is heated for 30 minutes by an oven set at a temperature of 230° C. thus hardening the organic insulation film PF. A film thickness of the organic insulation film PF at a non-exposed portion is 2 μm and a surface of the organic insulation film PF including the reflective region is formed into a flat surface.

Thereafter, in the same manner as the embodiment 1, aluminum is applied to the organic insulation film PF by sputtering thus forming a diffusion reflective electrode MT in the reflective region RA by photolithography-etching treatment. A reflective region of the diffusion reflective electrode MT has a flat-surface shape which traces a surface shape of the organic insulation film PF arranged below the diffusion reflective electrode MT. The diffusion reflective electrode MT is electrically connected with the pixel electrode PX at a portion thereof arranged close to the transmissive region.

COMPARISON EXAMPLE 2

Figure 8:
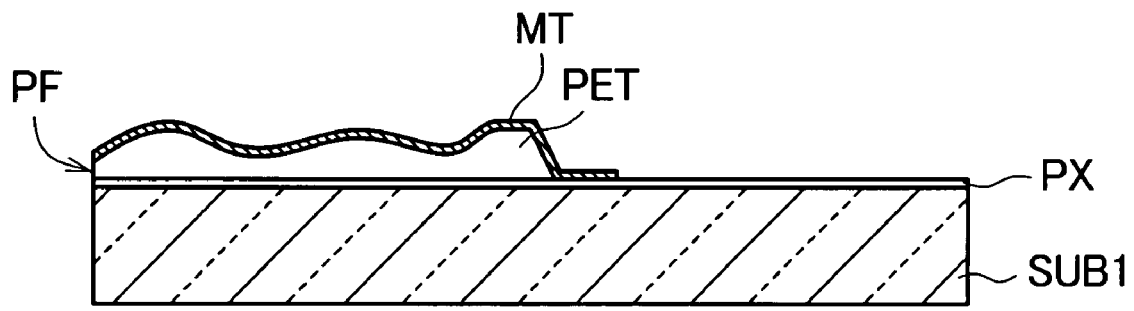
FIG. 8 is a cross-sectional view of an essential part for schematically explaining a transflective liquid crystal display device of a comparison example 2 to be compared with the present invention.

FIG. 8 is a cross-sectional view of an essential part for schematically explaining a transflective liquid crystal display device of a comparison example 2 to be compared with the present invention. In the comparison example 2, as an organic resin film material PET, an organic insulation film material solution which is formed by mixing NQD as a photosensitive agent into an acrylic resin in which specific gravity is adjusted to 1.05, refractive index is adjusted to 1.50, a total solid content is adjusted to 30% and viscosity is adjusted to 25 mPa·s is used, and spherical particles are not mixed into the organic insulation film material solution. The organic insulation film material solution is applied to an inner surface of the TFT substrate SUB1 by spin coating, and is dried by a hot plate thus forming an organic insulation film PF having a film thickness of 2.5 μm.

Using a half exposure mask in which an opening is formed in a transmissive region, light is blocked at a portion where the organic insulation film PF remains in the same manner as the embodiment 1, slits having a width of 1.5 μm are formed in a portion where recessed portions are formed for forming unevenness in a reflective region, and light blocking portions of 10 μm square are arranged on the slits at a pitch of 20 μm, the organic insulation film PF is exposed by an exposure machine having a numerical aperture NA of 0.08 with an exposure quantity of 150 mJ/cm$^2$. After such exposure, the organic insulation film PF is developed for 80 seconds using 0.4% of TMAH at a liquid temperature of 25° C. and, thereafter, the organic insulation film PF is cleaned with water. Here, a film thickness of the organic insulation film PF at a non-exposed portion is 2.3 μm. Then, the whole area of an inner surface of the substrate is radiated with light with an exposure quantity of 300 mJ/cm$^2$ so as to make a photosensitive agent transparent and, thereafter, the organic insulation film PF is heated for 30 minutes by an oven set at a temperature of 230° C. thus hardening the organic insulation film PF. The completed uneven portion of the organic insulation film PF has a gentle uneven surface in which the organic insulation film PF has a film thickness of 1 μm at the recessed portions and a film thickness of 2 μm at the non-exposed portion.

Thereafter, in the same manner as the embodiment 1, aluminum is applied to the organic insulation film PF by sputtering thus forming a diffusion reflective electrode MT in the reflective region RA by photolithography-etching treatment. A reflective region of the diffusion reflective electrode MT has a gentle uneven surface shape which traces a surface shape of the organic insulation film PF arranged below the diffusion reflective electrode MT. The diffusion reflective electrode MT is electrically connected with the pixel electrode PX at a portion thereof arranged close to the transmissive region.

COMPARISON EXAMPLE 3

Figure 9:
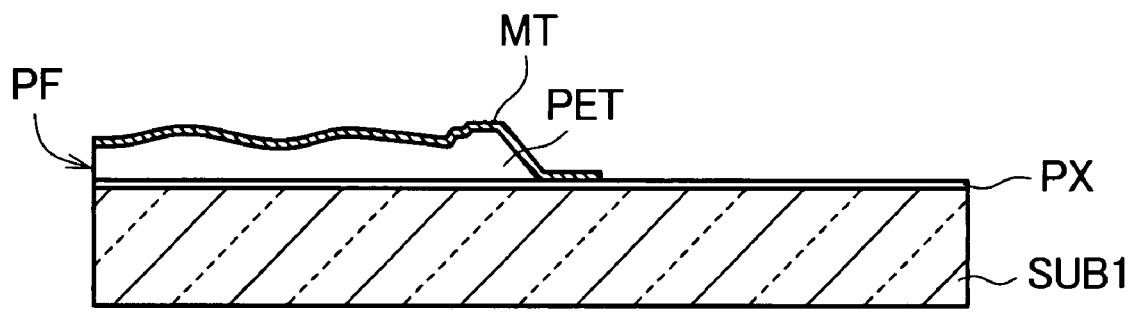
FIG. 9 is a cross-sectional view of an essential part for schematically explaining a transflective liquid crystal display device of a comparison example 3 to be compared with the present invention.

FIG. 9 is a cross-sectional view of an essential part for schematically explaining a transflective liquid crystal display device of a comparison example 3 to be compared with the present invention. In the comparison example 3, as an organic resin film material PET, an organic insulation film material solution which is formed by mixing NQD as a photosensitive agent into an acrylic resin in which specific gravity is adjusted to 1.05, refractive index is adjusted to 1.50, a total solid content is adjusted to 30% and viscosity is adjusted to 25 mPa·s is used, and spherical particles are not mixed into the organic insulation film material solution. The organic insulation film material solution is applied to an inner surface of the TFT substrate SUB1 by spin coating, and is dried by a hot plate thus forming an organic insulation film PF having a film thickness of 2.5 μm.

Using a half exposure mask in which an opening is formed in a transmissive region, light is blocked at a portion where the organic insulation film PF remains in the same manner as the embodiment 1, slits having a width of 1.5 μm are formed in a portion where recessed portions are formed for forming unevenness in a reflective region, and light blocking portions of 5 μm square are arranged on the slits at a pitch of 10 μm, the organic insulation film PF is exposed by an exposure machine having a numerical aperture NA of 0.08 with an exposure quantity of 150 mJ/cm$^2$. After such exposure, the organic insulation film PF is developed for 80 seconds using 0.4% of TMAH at a liquid temperature of 25° C. and, thereafter, the organic insulation film PF is cleaned with water. Here, a film thickness of the organic insulation film PF at a non-exposed portion is 2.3 μm. Then, the whole area of an inner surface of the substrate is radiated with light with an exposure quantity of 300 mJ/cm$^2$ so as to make a photosensitive agent transparent and, thereafter, the organic insulation film PF is heated for 30 minutes by an oven set at a temperature of 230° C. thus hardening the organic insulation film PF. The completed uneven portion of the organic insulation film PF has a gentle uneven surface in which the organic insulation film PF has a film thickness of 1.3 μm at the recessed portions and a film thickness of 1.5 μm at peaks of the projecting portions (attributed to the diffraction of exposure light and melting of a resin material) thus forming unevenness insufficient for diffusion. A film thickness of the organic insulation film PF at a non-exposed portion is 2 μm.

Thereafter, in the same manner as the embodiment 1, aluminum is applied to the organic insulation film PF by sputtering thus forming a diffusion reflective electrode MT in the reflective region RA by photolithography-etching treatment. A reflective region of the diffusion reflective electrode MT has a gentle uneven surface shape which traces a surface shape of the organic insulation film PF arranged below the diffusion reflective electrode MT. The diffusion reflective electrode MT is electrically connected with the pixel electrode PX at a portion thereof arranged close to the transmissive region.

A result of a measurement of the reflectance of light toward a front surface in the reflective region by changing an incident angle of light in the above-explained comparison examples and the embodiments of the present invention is shown in Table 1.

[Table 1]

TABLE 1

| | Reflectance of light toward front surface (%) | | | | |
|---|---|---|---|---|---|
| Light incident angle | Embodiment 1 | Embodiment 2 | Comparison example 1 | Comparison example 2 | Comparison example 3 |
| 0° | 6 | 5 | 30 | 5 | 20 |
| 5° | 13 | 15 | 4 | 14 | 6 |
| 10° | 9 | 8 | 2 | 11 | 3 |

Table 1 shows the result of measurement of the reflectance of light toward a front side of the diffusion plate background when the incident angle of light is changed. When a reflective display element is used, a light source becomes an external light (sun beams or indoor light) and hence, in an extremely large number of cases, light is incident from a position which makes a slight angle with respect to the front surface. Accordingly, it is possible to determine that the higher the front-face reflectance with respect to incident angles of 5°, 10°, the higher the pixel visibility of the reflective portion becomes.

In the embodiments 1, 2, the diffusion plate background having the sufficient performances can be acquired. It is unnecessary to provide light blocking portions for forming projecting portions in the slits and no restriction is imposed on the pixel size and hence, the present invention can cope with not only the pixels of high definition having the pixel size of approximately 20 μm but also the pixels having the finer pixel size.

The comparison example 1 has the flat diffusion plate background and hence, the comparison example 1 has a drawback that the regular reflection light is large in quantity and the diffusion reflection light is small in quantity whereby the diffusion plate background exhibits the insufficient performance as the diffusion plate.

The comparison example 2 shows the case in which the diffusion plate background is formed by forming the light blocking portions having 10 μm square shape on the slit. The comparison example 2 exhibits the sufficient performances and it is proved that the comparison example 2 can sufficiently cope with the middle-definition pixels provided that the pixel size is approximately 40 μm. However, in the comparison example 3 which forms the light blocking portions of 5 μm square on the slit in the same manner as the comparison example 2, the projecting portions are made thin by the diffraction of exposure light attributed to a demand for high definition, and the unevenness of the diffusion plate background cannot be maintained and is flattened due to melting of the resin material and hence, the comparison example 3 can only acquire the diffusion plate background exhibiting the insufficient performance that the regular reflection light is large in quantity and the diffusion reflection light is small in quantity. Such a comparison example 3 cannot cope with the high-definition pixels having the pixel size of approximately 20 μm.

Figure 10:
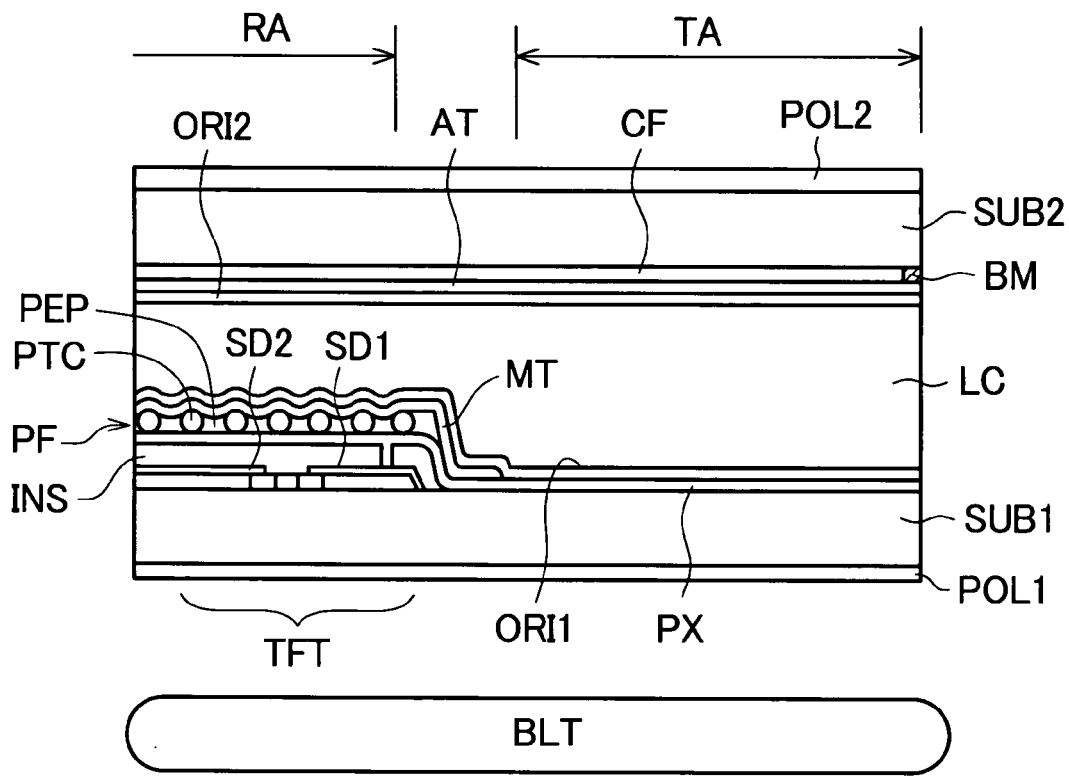
FIG. 10 is a schematic cross-sectional view for explaining one example of a transflective liquid crystal display device according to the present invention.

FIG. 10 is a schematic cross-sectional view for explaining one example the transflective liquid crystal display device according to the present invention. On the first substrate SUB1, scanning signal lines (gate lines), display signal lines (data lines), a pixel selection circuits such as thin film transistors (TFT) or the like, and a pixel circuit ON/OFF control circuit are integrally mounted. On an inner surface of the first substrate SUB1, pixel electrodes PX formed of a transparent conductive film preferably made of ITO which are driven by the thin film transistor TFT are formed. Detail of lines formed on the first substrate SUB1 and the structure of the thin film transistor are not shown in the drawing.

In the above-mentioned constitution, an interlayer insulation film INS is formed in a region of the thin film transistor TFT, and the pixel electrode PX is formed on the interlayer insulation film INS. The organic insulation film PF which is produced by mixing the spherical fine particles PTC into the organic resin film material PET is formed in the reflective region RA. The fine unevenness is formed on the surface of the organic insulation film PF due to the projection of the spherical fine particles PTC. The metal film MT preferably made of aluminum is formed on the organic insulation film PF. The metal film MT constitutes the diffusion reflective electrode having the fine uneven surface which traces the surface shape of the organic insulation film PF arranged below the metal film MT. The diffusion reflective electrode is connected with the pixel electrode PX to which a source electrode (or a drain electrode) SD1 of the thin film transistor is connected thus constituting the reflective portion RA. The pixel electrode PX is formed on the whole region of the transmissive portion TA on the inner surface of the first substrate SUB1 which constitutes the transparent substrate. Further, a first orientation film ORI1 is formed to cover the whole region of the pixel region.

On the other hand, on an inner surface of a second substrate SUB2, color filters CF which are defined from the neighboring pixels by a black matrix BM and common electrodes (counter electrodes) AT are formed, and a second orientation film ORI2 is formed on the color filters CF and common electrodes AT. A liquid crystal layer LC is sealed between the first orientation film and the second orientation film. Here, a polarizer POL2 is adhered to an outer surface of the second substrate SUB2. Further, a retardation plate and a reflection prevention film are also adhered to the outer surface of the second substrate SUB2 when necessary. A first polarizer POL1 or the like is also adhered to an outer surface of the first substrate SUB1. An illumination device (backlight) BLT is mounted on a back surface of the first substrate SUB1. According to such a liquid crystal display device, it is possible to acquire a transflective image display with high definition.

The present invention is not limited to the transflective liquid crystal display device, and is also applicable to a full-reflection liquid crystal display device in the same manner.

What is claimed is:

1. A liquid crystal display device which arranges a plurality of pixels each having a reflective region in the inside thereof in a matrix array, wherein the reflective region includes an organic insulation film which is formed of an organic insulation film material and particles contained in the organic insulation film material and having a refractive index substantially equal to a refractive index of the organic insulation film material, a diameter of the particles is set larger than a film thickness of the organic insulation film thus forming an uneven surface, and a diffusion reflective electrode which is formed of a metal film is formed on the uneven surface in a state that the metal film traces a surface shape of the uneven surface, wherein the pixel includes a transmissive region together with the reflective region therein, wherein the organic insulation film containing the particles in the reflective region extends to a boundary region between the transmissive region and the reflective region, and the film thickness of the organic insulation film in the boundary region is set larger than a diameter of the particles.

2. A liquid crystal display device according to claim 1, wherein a ratio between a cell gap in the reflective region and a cell gap in the transmissive region is set to 1:2.

3. A manufacturing method of a liquid crystal display device which includes a first substrate on which thin film transistors and pixel electrodes are formed and a second substrate which faces the first substrate in an opposed manner, and arranges a plurality of pixels each of which includes a reflective region therein in a matrix array, the manufacturing method of a liquid crystal display device comprising the steps of:

forming an organic insulation film on an inner surface of the first substrate by applying an organic insulation film material which is formed by mixing particles into an organic insulation resin material to the inner surface of the first substrate and, thereafter, by drying the organic insulation film material;

exposing the organic insulation film through an exposure mask having half tone exposure slits in a state that the half tone exposure slits correspond to the reflective regions and, thereafter, by developing the organic insulation film so as to reduce a film thickness of the organic insulation film in half-tone exposed portions by the half tone exposure slits thus exposing portions of the particles;

hardening the organic insulation film by baking the organic insulation film; and forming a metal thin film on an upper layer of the hardened organic insulation film thus forming a diffusion reflection layer having an uneven surface which traces an uneven surface formed by the exposure of the particles.

4. Manufacturing method of a liquid crystal display device according to claim 3, wherein in the half tone exposure in the exposure step, a film thickness of the organic insulation film is decreased by developing by an amount corresponding to 50% of a diameter of the particles.

5. A manufacturing method of a liquid crystal display device according to claim 3, wherein an arrangement pitch of unevenness of the diffusion reflection layer is adjusted at a mixing ratio of the particles in the organic insulation resin material of the organic insulation film material.

6. A manufacturing method of a liquid crystal display device according to claim 3, wherein the organic insulation resin material is formed by mixing naphthoquinone diazido which constitutes a photosensitive agent into one selected from a group consisting of an acrylic resin, an epoxy resin, an olefin resin and a phenol resin or is formed by mixing a photoacid generator into one selected from the group.

7. A manufacturing method of a liquid crystal display device which includes a first substrate on which thin film transistors and pixel electrodes are formed and a second substrate which faces the first substrate in an opposed manner, and arranges a plurality of pixels each of which includes a transmissive region and a reflective region therein in a matrix array, the manufacturing method of a liquid crystal display device comprising the steps of:

forming an organic insulation film on an inner surface of the first substrate by applying an organic insulation film material which is formed by mixing particles in an organic insulation resin material to the inner surface of the first substrate and, thereafter, by drying the organic insulation film material;

exposing the organic insulation film through an exposure mask having apertures and half tone exposure slits in a state that the apertures correspond to the transmissive regions and the half tone exposure slits correspond to reflective regions and, thereafter, by developing the organic insulation film so as to remove the organic insulation film in the exposed portions by the apertures and to reduce a film thickness of the organic insulation film in half-tone exposed portions by the half tone exposure slits thus exposing portions of the particles;

hardening the organic insulation film by baking the organic insulation film; and forming a metal thin film on an upper layer of the hardened organic insulation film thus forming a diffusion reflection layer having an uneven surface which traces an uneven surface formed by the exposure of the particles.

8. A manufacturing method of a liquid crystal display device according to claim 7, wherein in the half tone exposure in the exposure step, a film thickness of the organic insulation film is decreased by developing by an amount corresponding to 50% of a diameter of the particles.

9. A manufacturing method of a liquid crystal display device according to claim 7, wherein an arrangement pitch of unevenness of the diffusion reflection layer is adjusted at a mixing ratio of the particles in the organic insulation resin material of the organic insulation film material.

10. A manufacturing method of a transflective liquid crystal display device according to claim 7, wherein the organic insulation resin material is formed by mixing naphthoquinone diazido which constitutes a photosensitive agent into one selected from a group consisting of an acrylic resin, an epoxy resin, an olefin resin and a phenol resin or is formed by mixing a photoacid generator into one selected from the group.

* * * * *